(12) United States Patent
Katagiri et al.

(10) Patent No.: US 8,357,001 B2
(45) Date of Patent: Jan. 22, 2013

(54) PLUG LOCKING DEVICE

(75) Inventors: Toshiharu Katagiri, Aichi (JP); Keiji Kahara, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 21 days.

(21) Appl. No.: 13/106,603

(22) Filed: May 12, 2011

(65) Prior Publication Data
US 2011/0294328 A1 Dec. 1, 2011

(30) Foreign Application Priority Data
May 27, 2010 (JP) .................................. 2010-121782

(51) Int. Cl.
*H01R 13/62* (2006.01)
(52) U.S. Cl. ........................................................ 439/304
(58) Field of Classification Search .................. 439/304, 439/310, 352, 372, 345, 222, 550
See application file for complete search history.

(56) References Cited

U.S. PATENT DOCUMENTS
5,584,715 A * 12/1996 Ehrenfels ...................... 439/222
6,179,654 B1 * 1/2001 Witkowski et al. ........... 439/550

FOREIGN PATENT DOCUMENTS
JP 9-161898 A 6/1997

* cited by examiner

*Primary Examiner* — Alexander Gilman
(74) *Attorney, Agent, or Firm* — Patterson Thuente Christensen Pedersen, P.A.

(57) ABSTRACT

A locking device that locks a power feeding plug to an inlet of an plug-in vehicle to restrict removal of the power feeding plug from the inlet. The locking device includes a housing coupled to the inlet. The housing covers a peripheral portion of the inlet and includes a hook port that receives the hook when the power feeding plug is inserted into the inlet. A lock bar, which is arranged in the housing, moves between a lock position, in which the lock bar locks the hook to the inlet, and an unlock position, in which the lock bar permits the hook to move relative to the inlet. The lock bar, when located at the lock position, blocks the hook, which is hooked to the inlet, to restrict removal of the housing from the inlet.

10 Claims, 6 Drawing Sheets

PLUG LOCKING DEVICE

CROSS-REFERENCE TO RELATED APPLICATIONS

This application is based upon and claims the benefit of priority from prior Japanese patent application No. 2010-121782, filed on May 27, 2010, the entire contents of which are incorporated herein by reference.

BACKGROUND OF THE INVENTION

The present invention relates to a plug locking device.

Electric vehicles, which reduce carbon dioxide emissions, have become popular in recent years. Such an electric vehicle uses a battery to power a motor. Whenever the state of charge of the vehicle battery becomes low, the battery is charged, for example, with a household outlet or at a charging station. Japanese Laid-Open patent Publication No. 9-161898 describes a power feeding plug connected to a distal end of a power cable. The power feeding plug is connected to an inlet of a vehicle to charge the vehicle battery.

The time required to charge the battery of an electric vehicle is still much longer than the time required to refuel a gasoline engine vehicle. As a result, the vehicle may be left unattended over a long period of time with the power feeding plug connected to the inlet of the vehicle. In such a case, someone may wrongfully remove the power feeding plug and connect it to another vehicle to steal electricity or steal the power feeding plug.

Figure 8:
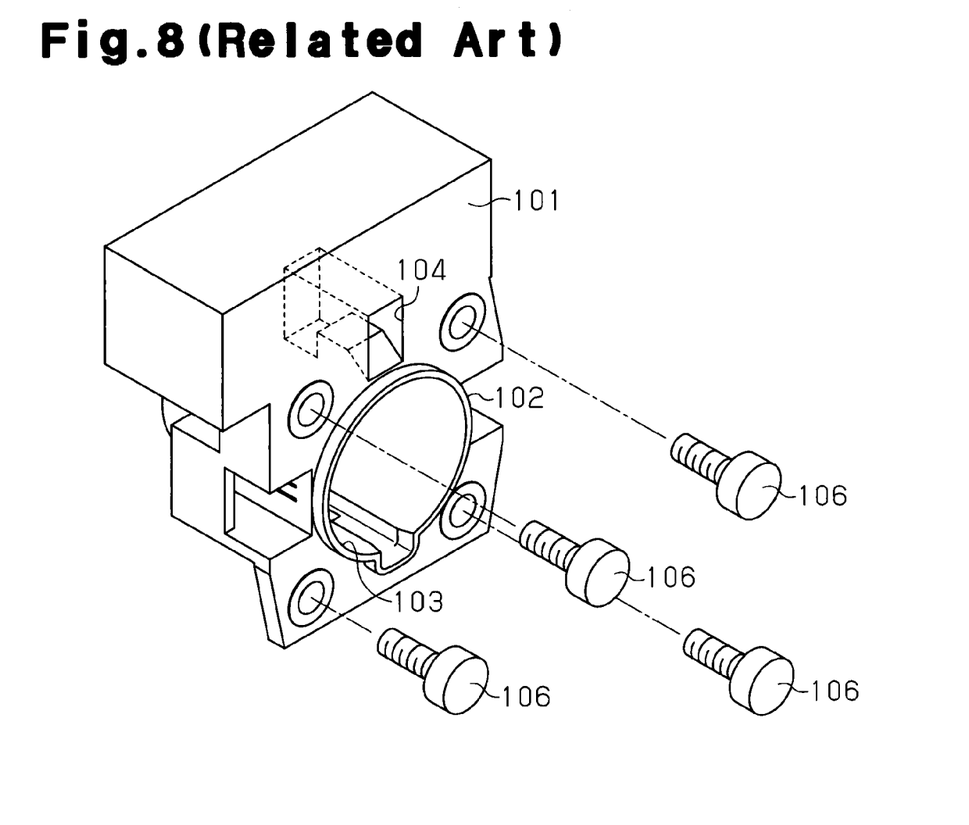
FIG. 8 is a perspective view showing a referential example of a locking device for a referential example.

FIG. 8 shows a referential example of a locking device 101, which locks a power feeding plug to an inlet 102 of a vehicle and prevents unauthorized removal of the power feeding plug. The locking device 101 is formed integrally with the inlet 102. The inlet 102 includes a plug port 103, which receives the power feeding plug, and a hooking hole 104, which is formed above the plug port 103. When the power feeding plug is connected to the inlet 102, the hooking hole 104 receives a hook of the power feeding plug. The hook is engaged with a projection in the hooking hole 104. A lock bar (not shown) of the locking device 101 blocks the hook in the hooking hole 104 to prevent the hook from being released from the hooking hole 104. This prevents unauthorized removal of the power feeding plug.

The inlet 102 is arranged in a side wall of the vehicle in the same manner as a fuel filler inlet of a gasoline vehicle. In the referential example shown in FIG. 8, bolts 106 fasten the locking device 101 to the vehicle. When the locking device 101 is coupled to the vehicle from the outer side by the bolts 106, the head of each bolt 106 is exposed toward the outer side of the vehicle. The locking device 101 prevents unauthorized removal of the power feeding plug from the plug port 103. However, when the bolts 106 are unfastened with a tool, the locking device 101 may be removed from the vehicle.

To solve this problem, the bolts 106 may fasten the locking device 101 to the vehicle from the inner side of the vehicle. However, the fastening of the bolts 106 from the inner side of the vehicle would be complicated.

SUMMARY OF THE INVENTION

One aspect of the present invention is a locking device that locks a hook of a power feeding plug, which is engaged to an inlet of a powered device, to restrict removal of the power feeding plug from the inlet. The locking device includes a housing coupled to the inlet. The housing covers a peripheral portion of the inlet, and the housing includes a hook port that receives the hook when the power feeding plug is inserted into the inlet. A movable member is arranged in the housing. The movable member moves between a lock position, in which the movable member blocks and locks the hook that is hooked to the inlet, and an unlock position, in which the movable member permits the hook to move relative to the inlet. The movable member, when located at the lock position, blocks the hook, which is hooked to the inlet, to restrict movement of the housing in a direction in which the housing is removed from the inlet.

A further aspect of the present invention is a locking device for use with an inlet including a plug port, which receives a power feeding plug, and a base, which includes a bolt hole. The locking device locks a hook of the power feeding plug in a state in which the hook is engaged with an outer surface of the plug port to restrict removal of the power feeding plug from the inlet. The locking device includes a housing having a frame, which receives the plug port, and a hook port, which receives the hook. A movable member moves between a lock position, in which the movable member is arranged inside the hook port, and an unlock position, in which the movable member is arranged outside the hook port. The movable member, when located at the lock position, locks the hook in a state in which the hook is engaged with the outer surface of the plug port. A controller moves the movable member to the lock position when the plug port receives the power feeding plug. The housing is fastened to the base to hide a fastening bolt, which is inserted into the bolt hole. When the plug port receives the power feeding plug and the movable member is located at the lock position, the movable member contacts the hook port and the hook, which is engaged with the outer surface of the plug port, to restrict removal of the housing from the base.

Another aspect of the present invention is a power supplying system including a power feeding plug having a hook. An inlet includes a plug port, which receives the power feeding plug, and a base, which includes a bolt hole. A locking device is fastened to the base of the inlet. The locking device locks the hook of the power feeding plug in a state in which the hook is engaged with an outer surface of the plug port to restrict removal of the power feeding plug from the inlet. The locking device includes a housing having a frame, which receives the plug port, and a hook port, which receives the hook. The frame has an inner dimension that is smaller than an outer dimension of the power feeding plug. A movable member moves between a lock position, in which the movable member is arranged inside the hook port, and an unlock position, in which the movable member is arranged outside the hook port. The movable member, when located at the lock position, locks the hook in a state in which the hook is engaged with the outer surface of the plug port. A controller moves the movable member to the lock position when the plug port receives the power feeding plug. The housing is fastened to the base to hide a fastening bolt, which is inserted into the bolt hole. When the plug port receives the power feeding plug and the movable member is located at the lock position, the movable member contacts the hook port and the hook, which is engaged with the outer surface of the plug port, to restrict removal of the housing from the base.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A locking device for a power feeding plug according to one embodiment of the present invention will now be described.

Figure 1:
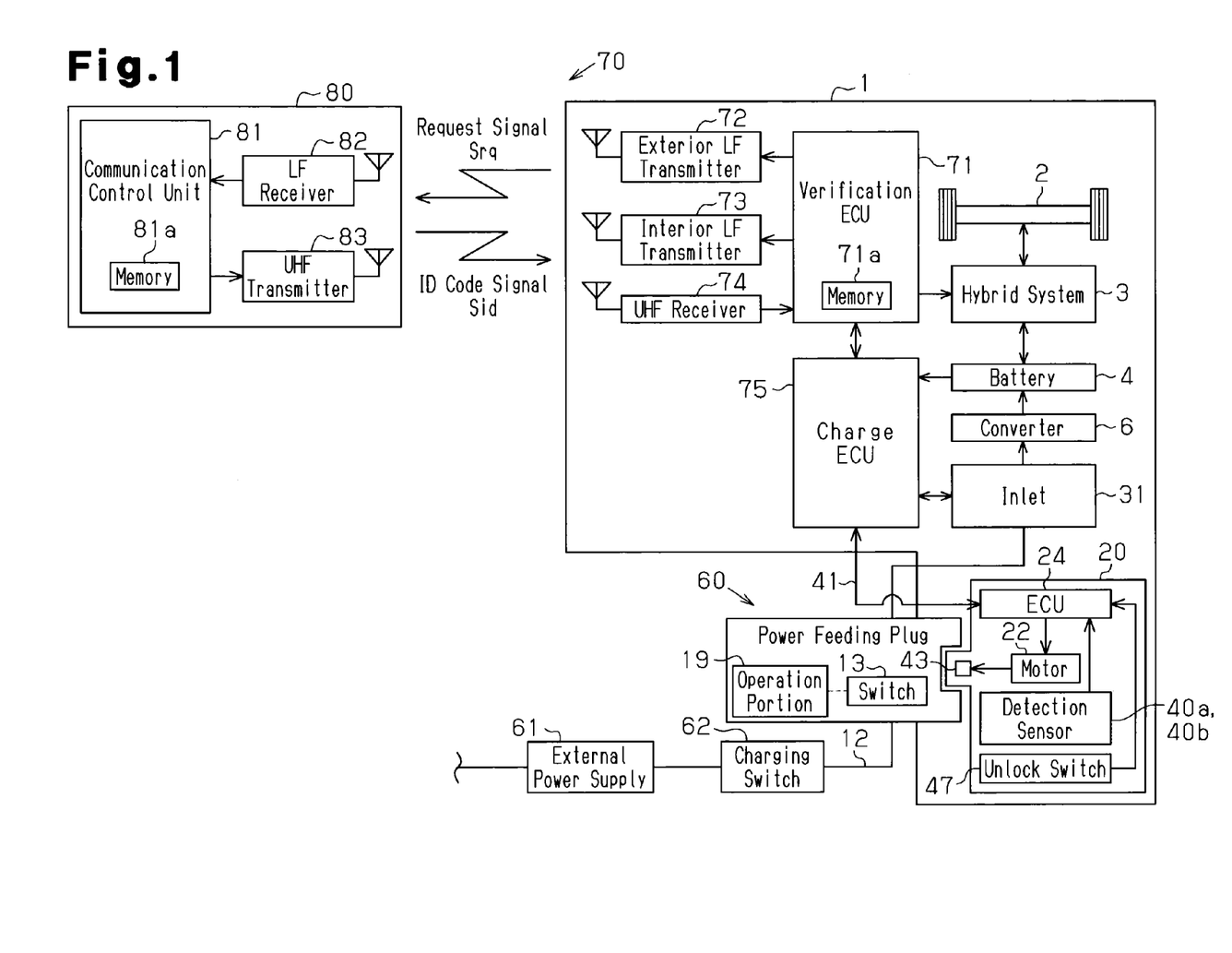
FIG. 1 is a block diagram of a vehicle including a charging system.

Referring to FIG. 1, a hybrid vehicle 1 includes a hybrid system 3, which uses a combination of an engine and a motor as a drive source to rotate drive wheels 2. The hybrid system 3 operates in a plurality of modes. More specifically, the hybrid system 3 operates in a mode using only the engine to drive the wheels 2, a mode using the motor while generating electric power with the engine to drive the wheels 2, a mode using both the engine and the motor to drive the wheels 2, and a mode using only the motor to drive the wheels 2.

The vehicle 1 includes a battery 4 that supplies power to the motor of the hybrid system 3. The battery 4 is chargeable by power generated by the engine and by an external power supply 61, which is connectable to the vehicle 1.

Further, the vehicle 1 includes an electronic key system 70 that, for example, locks and unlocks the vehicle doors without the driver having to manually operate a vehicle key. The electronic key system 70 includes communication devices of the vehicle 1 and an electronic key 80, which performs wireless communication with the communication devices.

The vehicle 1 includes a verification electronic control unit (ECU) 71, which verifies the electronic key 80 using ID codes. The verification ECU 71 includes a memory 71a, which stores an ID code unique to the vehicle 1. The verification ECU 71 is connected to the communication devices, namely, an exterior low frequency (LF) transmitter 72, an interior LF transmitter 73, and an ultrahigh frequency (UHF) receiver 74.

The exterior LF transmitter 72 is arranged in one or more doors of the vehicle and transmits a wireless signal in the LF band signal outside the vehicle 1. The interior LF transmitter 73 is arranged under the floor of the passenger compartment in the vehicle 1 and transmits a wireless signal in the LF band. The UHF receiver 74 in arranged in the vehicle 1 and receives a wireless signal in the UHF band.

The electronic key 80 includes a communication control unit 81. The communication control unit 81 includes a memory 81a, which stores an ID code unique to the electronic key 80. The communication control unit 81 includes an LF receiver 82, which receives wireless signals in the LF band, and a UHF transmitter 83, which transmits wireless signals in the UHF band in accordance with commands from the communication control unit 81.

The verification ECU 71 intermittently transmits an LF request signal Srq from the exterior LF transmitter 72 at a controlled timing and forms an exterior communication area near the vehicle 1. The exterior communication area extends over a certain distance from the vehicle 1. When the electronic key 80 enters the exterior communication area, the LF receiver 82 receives a request signal Srq. In response to the request signal Srq, the communication control unit 81 generates an ID code signal Sid, which contains the ID code registered in the memory 81a, in the UHF band. Then, the communication control unit 81 transmits the ID code signal Sid from the UHF transmitter 83. When the UHF receiver 74 receives the ID code signal Sid, the verification ECU 71 performs ID verification (exterior verification) using the ID code stored in the memory 71a and the ID code contained in the ID code signal Sid. When exterior verification is accomplished, the verification ECU 71 permits or performs the locking or unlocking of the doors with a door lock device (not shown).

When the verification ECU 71 detects a series of events including the accomplishment of exterior verification, the unlocking of a door, the opening of the door, and the entrance of the driver, the verification ECU 71 transmits a request signal Srq from the interior LF transmitter 73 and forms an interior communication area inside the entire vehicle 1. When the electronic key 80 responds to the request signal Srq in the interior communication area and returns an ID code signal Sid to the UHF receiver 74, the verification ECU 71 performs ID verification (interior verification) with the ID code registered in the memory 71a and the ID code contained in the received ID code signal Sid. When interior verification is satisfied, the verification ECU 71 permits activation of the hybrid system 3.

Referring to FIG. 1, the vehicle 1 is connectable to a plug-in type charge system 60, which charges the battery 4. The charge system 60 includes a connection cable 12 and a power feeding plug 10. The connection cable 12 is connected to an external power supply 61, such as one provided in a household or a charging station. The power feeding plug 10 is coupled to a distal end of the connection cable 12. In the illustrated example, the connection cable 12 includes a charging switch 62 operated to start charging. When the charging switch 62 is switched on or off, a corresponding operation signal is provided to the vehicle 1 via the power feeding plug 10. This starts or stops charging, which uses AC power from the external power supply 61.

The vehicle 1 includes an inlet 31, which receives the power feeding plug 10. The inlet 31 is a connector unit and may be arranged, for example, in a side wall of the vehicle body. A converter 6 is connected to the inlet 31. The converter 6 converts the AC power from the external power supply 61 to DC power. Then, the converter 6 supplies the DC power to the battery 4.

The vehicle 1 includes a charge ECU 75, which controls charging. The charge ECU 75 communicates with the verification ECU 71 via an in-vehicle local area network (not shown) and checks the results of the ID verification performed by the verification ECU 71. When determining accomplishment of exterior verification and connection of the power feeding plug 10 to the inlet 31, the charge ECU 75 permits charging of the battery 4. Then, in response to an on operation signal from the charging switch 62, the charge ECU 75 starts supplying power from the converter 6 to the battery 4.

As shown in FIG. 1, the vehicle 1 includes a locking device 20, which prevents unauthorized removal of the power feeding plug 10. The locking device 20 is coupled to the vehicle 1 by the inlet 31. The locking device 20 includes an ECU 24, a motor 22, and a lock bar 43. A connection wire 41 connects the ECU 24 in a communicable manner to the charge ECU 75.

When predetermined drive conditions are satisfied, the motor 22 is driven in accordance with a control signal from the ECU 24. The motor 22 drives and moves the lock bar 43. The removal of the power feeding plug 10 from the inlet 31 is permitted or restricted in accordance with the position of the lock bar 43.

The power feeding plug 10, the inlet 31, and the locking device 20 will now be described in detail.

Power Feeding Plug

Figure 2:
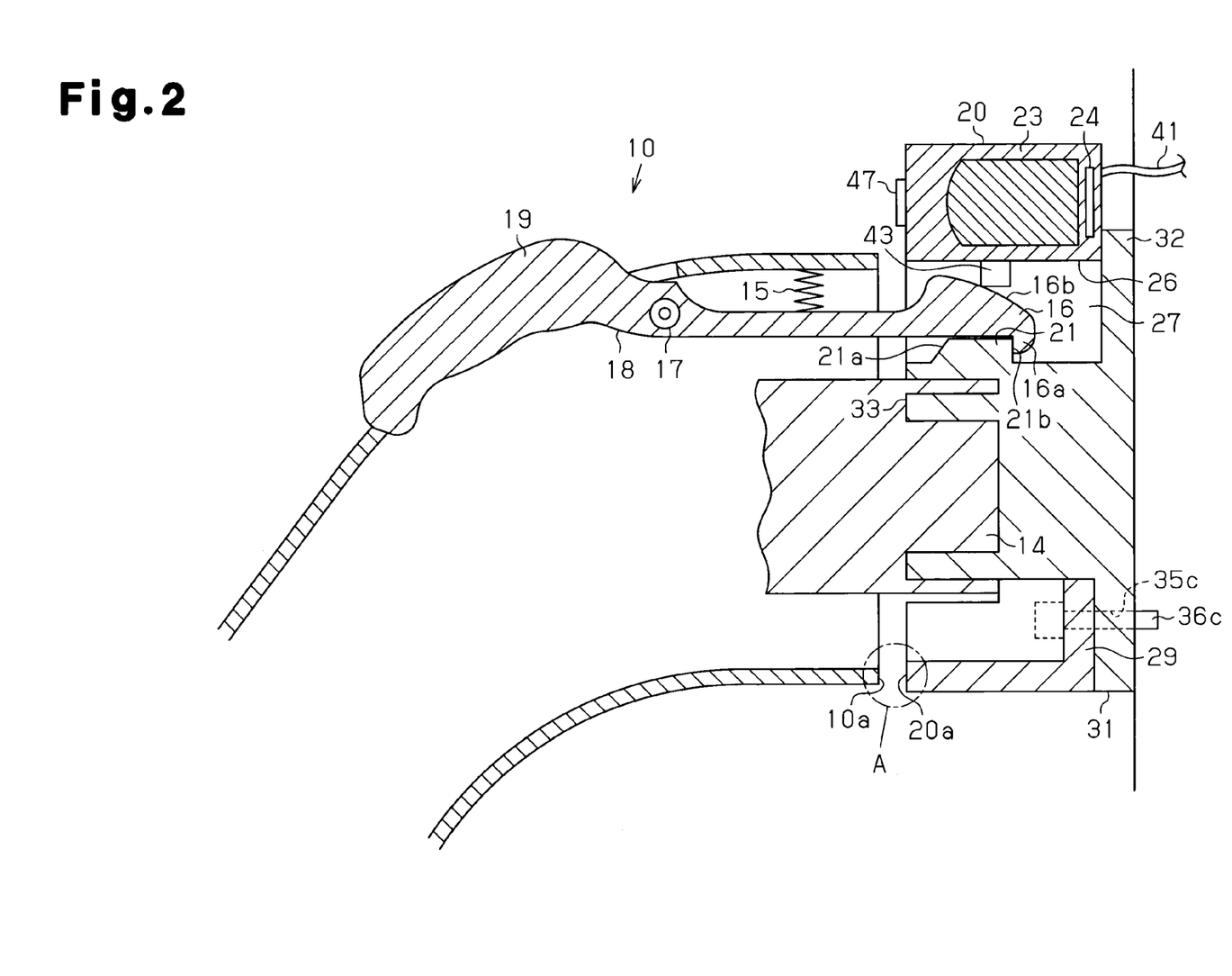
FIG. 2 is a cross-sectional view of a power feeding plug and an inlet.

Referring to FIG. 2, the power feeding plug 10 includes a coupler 14, which accommodates a plurality of connection terminals. The coupler 14 projects from a distal end of the power feeding plug 10. The connection terminals of the power feeding plug 10 are electrically connected to the connection terminals of the inlet 31. Further, the connection terminals of the power feeding plug 10 include a power terminal, which is connected by a power line to the external power supply 61, and a control terminal, which is connected by a signal line to the charging switch 62 to provide the operation signal of the charging switch 62 to the inlet 31.

As shown in FIG. 2, the power feeding plug 10 includes a lock lever 18. The lock lever 18 is pivotal about a pivot shaft 17, which is located at a middle part of the lock lever 18 in the longitudinal direction. The lock lever 18 has one end forming a hook 16 and another end forming an operation portion 19, which projects out of the power feeding plug 10. The hook 16 is tapered and includes a downward-directed catch 16a and an upper sloped surface 16b.

An urging spring 15 is arranged between the pivot shaft 17 and the hook 16. The urging spring 15 urges the lock lever 18 to move the hook 16 downward. When the hook 16 is located at a normal position, or initial position, the urging spring 15 is in an expanded state. When the operation portion 19 is pushed, the lock lever 18 is pivoted about the pivot shaft 17 against the urging force of the urging spring 15. This moves the hook 16 upward from the initial position.

Referring to FIG. 1, the power feeding plug 10 includes a switch 13, which is activated and deactivated in accordance with the operation of the operation portion 19. A signal line connects the switch 13 to the charging switch 62. The resistance of the signal line is varied in accordance with the activation and deactivation of the switch 13. In the illustrated example, the resistance of the signal line increases when the switch 13 is activated.

Inlet

Figure 3:
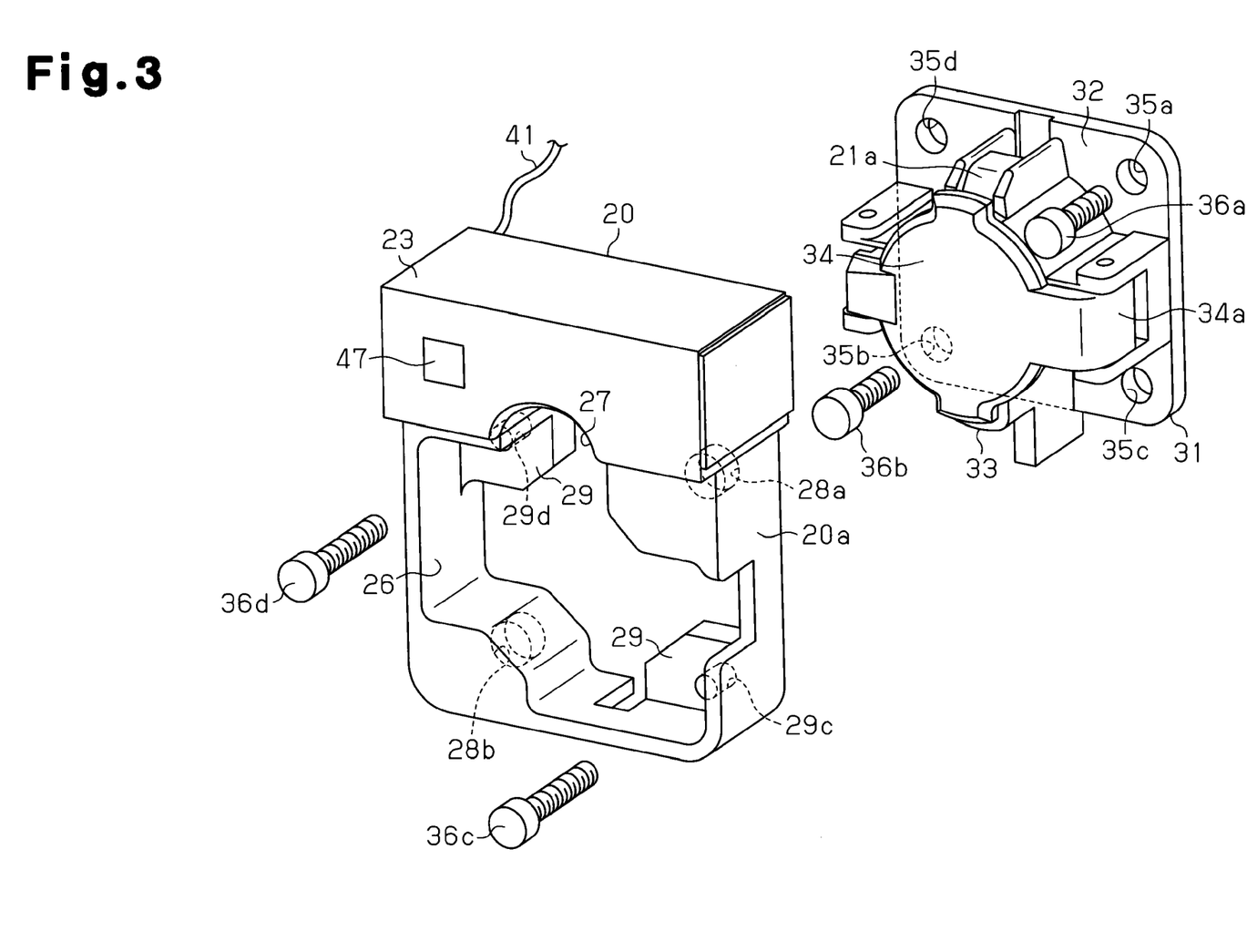
FIG. 3 is a perspective view showing a locking device and the inlet.

As shown in FIG. 3, the inlet 31 includes a tetragonal base 32 and a tubular plug port 33. A lid 34, which is supported by the base 32, closes the plug port 33. The lid 34 may be moved about a shaft 34a to open the plug port 33. When the lid 34 is in an open state, the plug port 33 may receive the coupler 14 of the power feeding plug 10, as shown in FIG. 2. The connection terminals (not shown) of the inlet 31 are arranged in the plug port 33. The connection terminals of the inlet 31 include a power terminal, which is connected by a power line to the converter 6, and a control terminal, which is connected by a signal line to the charging switch 62 to receive the operation signal of the charging switch 62.

Insertion of the coupler 14 of the power feeding plug 10 into the plug port 33 electrically connects the connection terminals of the inlet 31 to the connection terminals of the power feeding plug 10. This allows for power to be supplied to the battery 4 from the external power supply 61 via the power line and allows for the operation signal of the charging switch 62 to be received by the charge ECU 75 via the signal line.

Figure 4:
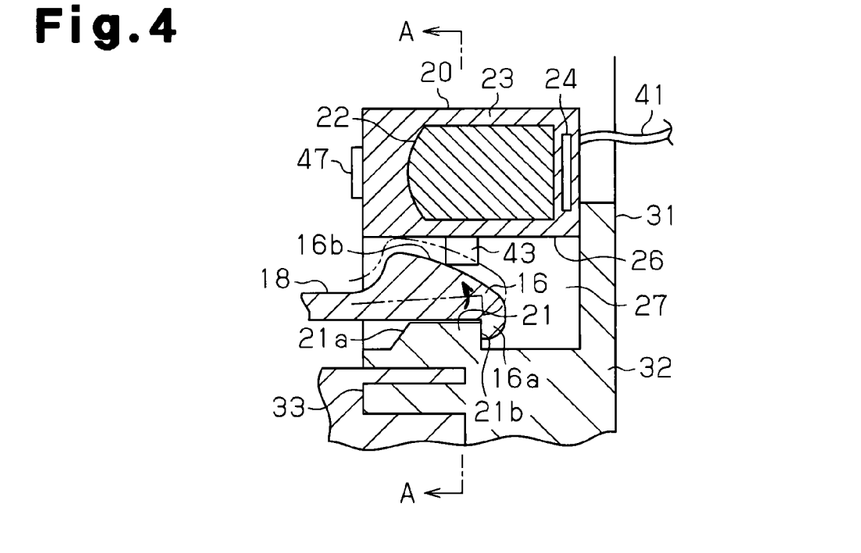
FIG. 4 is a partially enlarged view of FIG. 2.

As shown in FIG. 4, a hooking portion 21, which engages with the hook 16, is formed on the outer surface of the plug port 33. The hooking portion 21 includes a guide surface 21a, which is inclined relative to the outer surface of the plug port 33, and a hooking surface 21b, which is generally orthogonal to the outer surface of the plug port 33.

When the coupler 14 of the power feeding plug 10 is inserted into the plug port 33, the hook 16 moves along the guide surface 21a in a lifted state. The lock lever 18 is pivoted against the urging force of the urging spring 15. As the hook 16 moves beyond the hooking portion 21, the urging force of the urging spring 15 lowers the hook 16, and the catch 16a engages with the hooking portion 21. In this state, the power feeding plug 10 cannot be removed from the plug port 33. The hook 16 and the hooking portion 21 function as a plug holding mechanism.

When the operation portion 19 of the power feeding plug 10 is pushed, the hook 16 moves upward as shown by the broken lines in FIG. 4. This releases the catch 16a from the hooking portion 21. In this state, the power feeding plug 10 is removable from the plug port 33.

The procedures for coupling the inlet 31 to the vehicle 1 will now be described. As shown in FIG. 3, the base 32 has four corners respectively including bolt holes 35a to 35d. First, a bottom surface of the base 32 is placed on the vehicle 1. In this state, bolts 36a and 36b are respectively inserted into the bolt holes 35a and 35b, which are located at diagonal positions. Then, the bolts 36a and 36b fasten the base 32 to the vehicle 1. In this manner, the bolts 36a and 36b fasten diagonal positions of the base 32 to the vehicle 1. This balances the fastening force applied by the inlet 31 to the vehicle 1.

Locking Device

Figure 5:
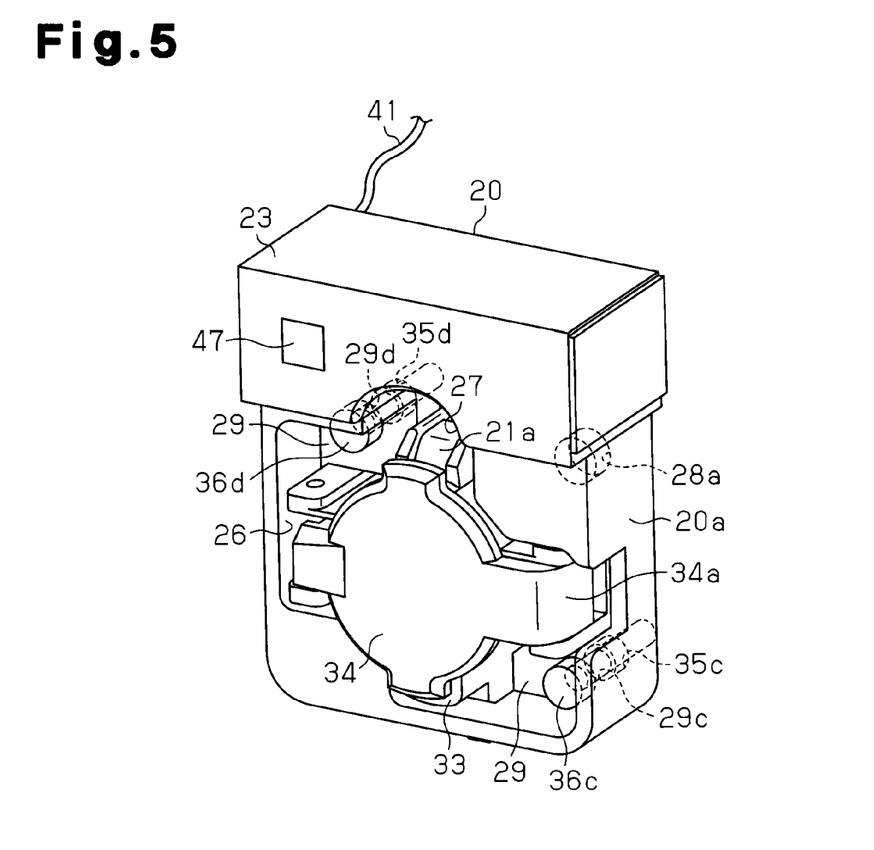
FIG. 5 is a perspective view a locking device coupled to the inlet.

As shown in FIGS. 3 and 5, the locking device 20 includes a housing 20a, which is coupled in a removable manner to the inlet 31. This allows for the locking device 20 to be coupled to an existing inlet 31 to retrofit the inlet 31. The housing 20a of the locking device 20 covers and hides the four corners of the inlet 31, in particular, the bolts 36a and 36b fastened to the vehicle 1.

The locking device 20 will now be described in detail. The housing 20a of the locking device 20 includes a frame 26 defining a reception hole that receives the plug port 33. The housing 20a includes a recess that defines a hook port 27 at a location corresponding to the hooking portion 21 of the inlet 31. As shown in FIG. 2, when the housing 20a of the locking device 20 is coupled to the inlet 31, the hooking portion 21 is located in the hook port 27.

Figure 6:
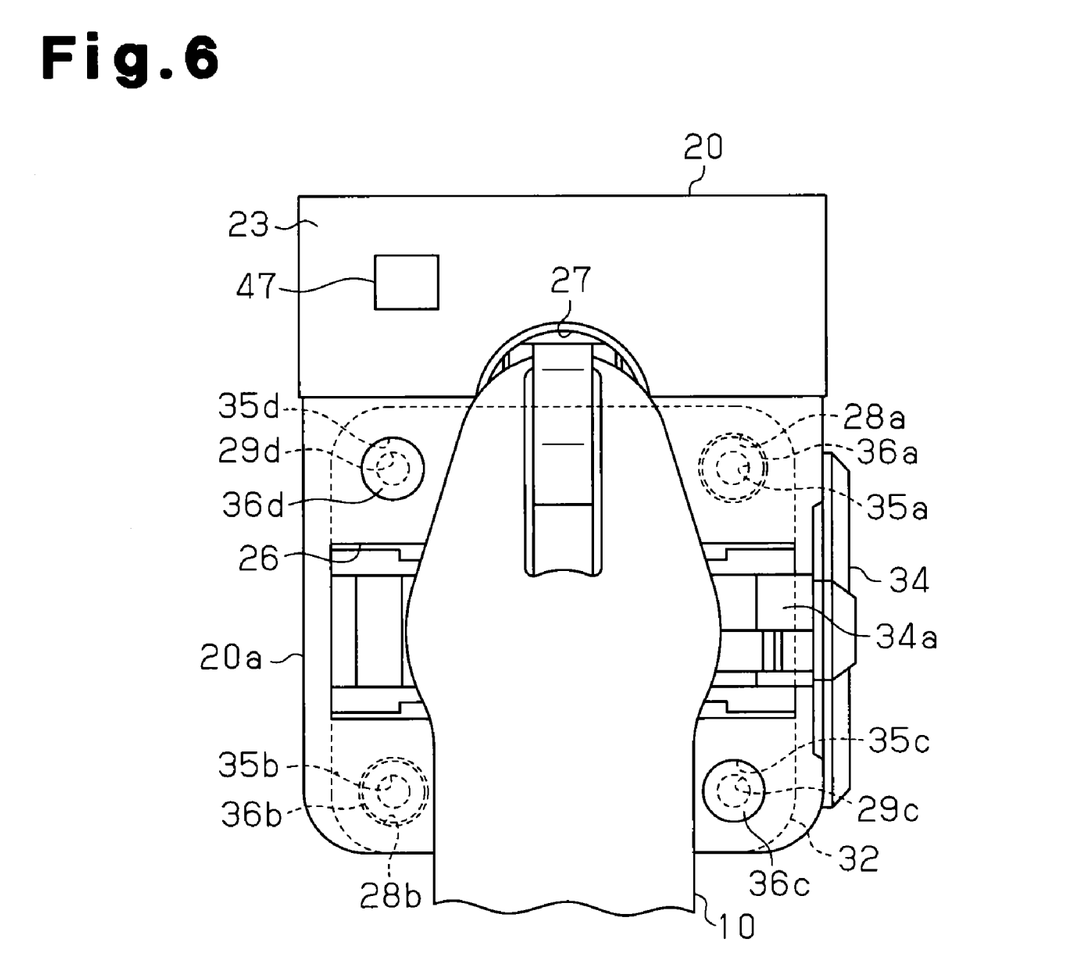
FIG. 6 is a front view showing the inlet in a state receiving the power feeding plug.

Each of the bolts 36a and 36b, which fasten the inlet 31 to the vehicle 1, includes a head that projects out of an upper surface of the base 32. The housing 20a of the locking device 20 includes recesses 28a and 28b, which respectively accommodate the heads of the bolts 36a and 36b. Accordingly, as shown in FIG. 6, when the housing 20a of the locking device 20 is coupled to the inlet 31, the heads of the bolts 36a and 36b are arranged in the recesses 28a and 28b. Thus, the bolts 36a and 36b are covered and hidden by the housing 20a. FIG. 6 also shows that the housing 20a covers the base 32, that is, the peripheral portion of the inlet 31.

As shown in FIG. 3, the housing 20a includes fastening plates 29, which fasten the housing 20a to the inlet 31. In the illustrated example, two fastening plates 29 are arranged at positions corresponding to the bolt holes 35c and 35d in the base 32 of the inlet 31. The fastening plates 29 extend inward from the frame 26 of the housing 20a.

As shown in FIG. 5, the plug port 33 is arranged between the two fastening plates 29. This holds the plug port 33 in the frame 26 of the housing 20a. As shown in FIG. 3, the two fastening plates 29 respectively include bolt holes 29c and 29d. Referring to FIG. 6, the bolt holes 29c and 29d of the fastening plates 29 are respectively in communication with the bolt holes 35*c* and 35*d* of the base 32 when the housing 20*a* of the locking device 20 is coupled to the inlet 31. A bolt 36*c* is inserted into the bolt holes 29*c* and 35*c*, and a bolt 36*d* is inserted into the bolt holes 29*d* and 35*d*. The bolts 36*c* and 36*d* are then fastened to fix the two fastening plates 29 to the base 32. This fastens the locking device 20 together with the inlet 31 to the vehicle 1. The bolts 36*c* and 36*d* include shafts that are preferably longer than those of the bolts 36*a* and 36*b* by an amount corresponding to the axial length of the bolt holes 29*c* and 29*d*. The bolt holes 29*c* and 35*c* are diagonal to the bolt holes 29*d* and 35*d*, respectively. This balances the fastening force applied by the locking device 20 and the inlet 31 to the vehicle 1.

The power feeding plug 10 includes a housing 10*a*. To prevent the housing 10*a* from being inserted into the housing 20*a* of the locking device 20, the inner dimensions of the frame 26 are smaller than the outer dimensions of the power feeding plug 10. In FIG. 2, as shown by encircled section A, when the power feeding plug 10 is inserted into the plug port 33, and end surface of the housing 20*a* of the locking device 20 faces an end surface of the housing 10*a* of the power feeding plug 10.

Figure 7:
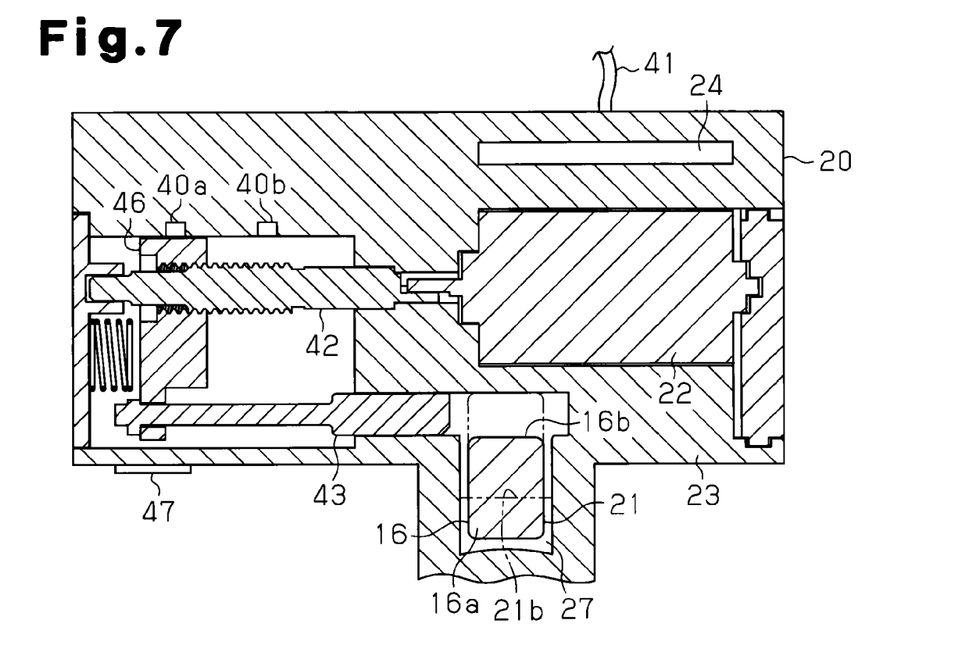
FIG. 7 is a cross-sectional view taken along line A-A in FIG. 4.

The locking device 20 includes a lock unit 23. As shown in FIG. 7, the lock unit 23 includes a motor 22, a transmission member 42, the lock bar 43, a stopper 46, the ECU 24, and detection sensors 40*a* and 40*b*. The transmission member 42 is coupled to the motor 22. The lock bar 43 is coupled to the transmission member 42.

The connection wire 41, which is connected to the lock unit 23, extends from the rear of the housing 20*a*. The connection wire 41 is connected to the charge ECU 75 of the vehicle 1. The connection wire 41 includes a signal line, which connects the ECU 24 to the charge ECU 75 in a communicable manner, and a power line, which allows for the charge ECU 75 to supply the motor 22 and the ECU 24 with power.

The motor 22 includes an output shaft, which extends perpendicular to the direction in which the power feeding plug 10 is inserted into the inlet 31. The transmission member 42 includes a geared shaft, which is coaxially coupled to the output shaft of the motor 22. The stopper 46 is mated with the transmission member 42 to be movable back and forth. The lock bar 43 is coupled to a lower portion of the stopper 46. The lock bar 43 is parallel to the axis of the transmission member 42.

When the motor 22 drives and rotates the transmission member 42 in forward or reverse directions, the stopper 46 linearly moves in left or right directions as viewed in FIG. 7. The lock bar 43 moves in the same direction as the stopper 46. Further, the lock bar 43 moves into the hook port 27 to a lock position (FIGS. 2 and 4) and out of the hook port 27 to an unlock position (FIG. 7).

When the lock bar 43 is located at the lock position in the hook port 27, the lock bar 43 occupies the space above the hook 16, which blocks the hooking surface 21*b*. In this state, the operation portion 19 of the power feeding plug 10 cannot be pushed. Thus, the hook 16 cannot be moved, and the power feeding plug 10 is locked. This prohibits removal of the power feeding plug 10 from the plug port 33.

When the lock bar 43 is located at the unlock position, the lock bar 43 is separated from above the hook 16 in the hook port 27. Thus, when the operation portion 19 of the power feeding plug 10 is pushed, the hook 16 is disengaged from the hooking portion 21. This permits the power feeding plug 10 to be removed from the plug port 33.

As shown in FIG. 7, the locking device 20 includes the detection sensors 40*a* and 40*b*, which may be proximity sensors, to detect the presence of the stopper 46. The detection sensors 40*a* and 40*b* each provide the ECU 24 with a signal when detecting the presence of the stopper 46. The detection sensor 40*a* is arranged at a position that is closest to the stopper 46 when the lock bar 43 is located at the unlock position. The detection sensor 40*b* is arranged at a position that is closest to the stopper 46 when the lock bar 43 is located at the lock position. The detection sensors 40*a* and 40*b* allow for the ECU 24 to recognize that the lock bar 43 is located at the lock position or the unlock position, that is, in a lock state or an unlock state.

The operation of the operation portion 19 operates the switch 13, which varies the resistance of the signal line accordingly. The charge ECU 75 uses the resistance of the signal line to determine whether or not the hook 16 is hooked to the hooking portion 21, that is, whether or not the power feeding plug 10 is properly inserted into the inlet 31. When the ECU 24 determines that the hook 16 has been hooked to the hooking portion 21 and that ID verification has been accomplished through communication with the charge ECU 75 and the verification ECU 71, the ECU 24 drives the motor 22 and moves the lock bar 43 from the unlock position to the lock position. Then, when the charge ECU 75 determines that ID verification has been accomplished and that the lock bar 43 has been moved to the lock position through communication between the verification ECU 71 and the ECU 24, the charge ECU 75 shifts the battery 4 to a chargeable state. When the charging switch 62 is switched on, the charging of the battery 4 is started.

An unlock switch 47 is arranged on the outer surface of the lock unit 23. When the unlock switch 47 is operated, the ECU 24 receives a corresponding operation signal. When receiving the operation signal from the unlock switch 47 after ID verification is accomplished, the ECU 24 drives the motor 22 and moves the lock bar 43 to the unlock position. This allows for the hook 16 to be disengaged from the hooking portion 21 and permits removal of the power feeding plug 10 from the plug port 33. When ID verification is not accomplished such as when the electronic key 80 is not located near the vehicle 1, the ECU 24 does not respond to the operation signal of the unlock switch 47 and does not move the lock bar 43 to the unlock position.

Referring to FIG. 6, a tool or the like may be used to rotate the bolts 36*c* and 36*d*, which are exposed to the exterior from the housing 20*a*, and remove the locking device 20 from the inlet 31. However, even when the bolts 36*c* and 36*d* are unfastened, the locking device 20 cannot be removed from the inlet 31 as long as the power feeding plug 10 is connected to the inlet 31 and the hook 16 is locked. More specifically, in the state shown in FIG. 2, due to the lock bar 43, the hook 16 is fixed to the hook port 27. Thus, the locking device 20 is also fixed to the inlet 31. For example, when the exposed bolts 36*c* and 36*d* are unfastened, force may be applied to the locking device 20 to remove it from the vehicle 1. In this case, the lock bar 43 would contact the sloped surface 16*b* of the hook 16. However, the sloped surface 16*b* is sloped upward toward the basal end of the lock lever 18. Accordingly, as the lock bar 43 moves toward the basal end of the lock lever 18 while pushing the sloped surface 16*b*, the hook 16 is forced downward. This strengthens the engagement of the hook 16 with the hooking portion 21. The inlet 31, which includes the hooking portion 21, is fixed to the vehicle 1. Thus, the inlet 31 cannot be moved even when receiving downward force from the hook 16.

Further, a gap formed between the sloped surface 16*b* of the hook 16 and the opposing wall of the hook port 27 narrows toward the outer side of the vehicle 1. At a location in which the gap between the hook 16 and the opposing wall of the hook port 27 becomes narrowest, the gap is smaller than the thickness of the lock bar 43. Thus, the lock bar 43 cannot move beyond the hook 16. This keeps the hook 16 engaged with the hooking surface 21b.

Accordingly, when someone attempts to remove the locking device 20 and applies force to the locking device 20 to do so, the positional relationship of the lock bar 43, hook 16, and hooking portion 21 remain the same. This prevents the locking device 20 from being removed from the inlet 31. Thus, even when the bolts 36c and 36d are unfastened, removal of the locking device 20 from the inlet 31 is prevented.

Even if the locking device 20 were to be slightly moved away from the inlet 31, the housing 20a of the locking device 20 would contact the housing 10a of the power feeding plug 10. Since the housing 10a of the power feeding plug 10 cannot be inserted into the frame 26 of the housing 20a, the locking device 20 is prevented from being removed from the inlet 31.

When someone attempts to entirely remove the inlet 31, the power feeding plug 10, and the locking device 20, the heads of the bolts 36a and 36b, which fix the inlet 31 to the vehicle 1, are covered and hidden by the housing 20a of the locking device 20. This prevents the inlet 31, the power feeding plug 10, and the locking device 20 from being entirely removed.

When the power feeding plug 10 is not inserted into the inlet 31, the lock bar 43 is separated from the hook port 27 and held at the unlock position. In this state, the lock bar 43 does not block the hook 16. Thus, the locking device 20 may be removed from the inlet 31 by unfastening the bolts 36c and 36d. This allows for the locking device 20 to be replaced when, for example, the locking device 20, particularly, the lock unit 23, fails to function properly.

Further, the locking device 20 may be coupled to an inlet 31 that has already been installed in the vehicle 1 to retrofit the inlet 31. For example, the bolts 36a to 36d are all inserted into the bolt holes 35a to 35d to fasten the inlet 31 to the vehicle 1. Thus, a tool or the like is used to unfasten bolts from the bolt holes 35c and 35d. Then, the locking device 20 is coupled to the inlet 31 from the outer side. In a state in which the locking device 20 is in contact with the base 32, the bolts 36c and 36d are inserted into the corresponding bolt holes 29c, 35c, 29d, and 35d and fastened to the vehicle 1 by the inlet 31 (base 32). Thus, the retrofitting of the inlet 31 with the locking device 20 easily adds an unauthorized removal prevention function to the power feeding plug 10.

The advantages of the present embodiment will now be discussed.

(1) When the power feeding plug 10 is not inserted into the inlet 31, the hook 16 is disengaged from the hooking portion 21. Thus, the locking device 20 may be coupled to and removed from the inlet 31. More specifically, in a state in which the base 32 of the inlet 31 is covered by the housing 20a of the locking device 20, the locking device 20 and the inlet 31 may be fastened to the vehicle 1 from the outer side. Accordingly, this facilitates the coupling of the locking device 20 to the inlet 31, which is fixed to the vehicle 1.

When the power feeding plug 10 is inserted into the inlet 31, the hook 16 of the power feeding plug 10 is hooked to the hooking portion 21 of the inlet 31. Further, the lock bar 43 locks the hook 16. In this state, the bolts 36c and 36d, which fasten the locking device 20 to the vehicle 1, are exposed to the exterior from the housing 20a. Thus, the bolts 36c and 36d can be unfastened. However, when the bolts 36c and 36d are unfastened and the locking device 20 is moved in a direction of removal from the vehicle 1, the lock bar 43, which is located at the lock position, contacts the sloped surface 16b of the hook 16 on the power feeding plug 10. Thus, the hook 16 remains fixed due to the engagement with the hooking portion 21 of the inlet 31. The cooperation of the lock bar 43, the hook 16, and the hooking portion 21 prevents removal of the locking device 20 from the inlet 31. Further, the power feeding plug 10 cannot be entirely removed from the inlet 31. In this manner, the coupling of the locking device 20 to the inlet 31 is facilitated. At the same time, security against unauthorized removal of the power feeding plug 10 is improved.

(2) The heads of the bolts 36a and 36b, which fasten the inlet 31 to the vehicle 1, are hidden since they are arranged in the recesses 28a and 28b of the housing 20a. Thus, the bolts 36a and 36b are difficult to remove with a tool. This prevents the locking device 20 and the power feeding plug 10 from being removed together with the inlet 31 from the vehicle 1. As a result, security against unauthorized removal of the power feeding plug 10 is improved.

Special bolts, which require a special tool, may be used to fasten the inlet 31 to the vehicle 1. This would improve security without hiding the heads of the special bolts. However, the special bolts would be difficult to procure compared to normal bolts. Further, the special bolts would require the special tool. In addition, if someone acquires the special tool, the locking device 20 can be easily removed. In contrast, the structure of the present embodiment does not use special bolts and thus resolves such a problem.

(3) The housing 20a of the locking device 20 includes bolt holes 29c and 29d, which are in communication with the bolt holes 35c and 35d of the inlet 31. The locking device 20 is fastened through the inlet 31 to the vehicle 1, while using the bolt holes 35c and 35d of the inlet 31. Thus, for example, when retrofitting the inlet 31 by adding the locking device 20, the inlet 31 does not require new holes. This further facilitates the retrofitting of the inlet 31 with the locking device 20.

(4) The frame 26 of the housing 20a in the locking device 20 has inner dimensions that are smaller than the outer dimensions of the power feeding plug 10. Accordingly, when someone attempts to remove the locking device 20 in a state in which the power feeding plug 10 is connected to the inlet 31, the housing 20a of the locking device 20 cannot enter the frame 26 of the housing 20a. This prevents removal of the locking device 20. As a result, security against unauthorized removal of the power feeding plug 10 is improved.

(5) The hook 16 arranged in the hook port 27 includes a lower surface, which engages with the hooking portion 21, and an upper surface, which engages with the lock bar 43. The upper surface of the hook 16 is sloped so that the opposing wall of the hook port 27 becomes closer as the basal end of the hook 16 becomes closer. In this structure, when someone attempts to remove the locking device 20, the lock bar 43 and the hook 16 are held between the hooking portion 21 and the opposing wall of the hook port 27. Thus, the locking device 20 cannot be removed. Further, the force clamping the lock bar 43 and the hook 16 increases as the force applied to remove the locking device 20 increases. This makes it further difficult to remove the locking device 20 when the hook 16 is locked.

It should be apparent to those skilled in the art that the present invention may be embodied in many other specific forms without departing from the spirit or scope of the invention. Particularly, it should be understood that the present invention may be embodied in the following forms.

In the embodiment described above, the exterior LF transmitter 72 and the UHF receiver 74 of the electronic key system 70 are also used by the charge system 60. However, a transmitter and receiver dedicated for the transfer of wireless signals between the locking device 20 and the electronic key 80 may be used. In this manner, by using a dedicated transmitter and receiver, a communication area that is further optimal for the charge system 60 may be formed. More specifically, a communication area may be formed in the vicinity of the inlet 31.

In the embodiment described above, the electronic key system that is employed is a so-called operation-free-key system that transfers a request signal Srq and an ID code signal Sid between the electronic key 80 and the vehicle 1. However, as long as ID verification can be performed between the electronic key 80 and the vehicle 1, a wireless key system that transmits request signals in one direction from the electronic key 80 to the vehicle 1 may be employed. Further, the electronic key system may be eliminated. In this case, for example, in a state in which the vehicle doors are locked by a mechanical key, the hook 16 is in a lock state when the power feeding plug 10 is inserted into the plug port 33. When the mechanical key unlocks the vehicle doors, the hook 16 shifts to an unlock state. Such a structure that shifts the lock state of the hook 16 based on the locked state of the vehicle doors is not limited to the mechanical key and may be employed for the electronic key system of the above embodiment and a wireless key system.

The charge ECU 75 monitors whether or not the hook 16 is hooked to the hooking portion 21 in accordance with the resistance of the signal line between the power feeding plug 10 and the vehicle 1. To detect whether or not the hook 16 is hooked to the hooking portion 21, for example, a proximity sensor or pressing sensor may be connected to the charge ECU 75. A proximity sensor is arranged, for example, on the wall of the hook port 27 opposing the hooking portion 21. The pressing sensor is arranged, for example, at a location that is pressed when the hook 16 engages with the hooking portion 21.

The ECU 24 communicates with the charge ECU 75 and the verification ECU 71 to determine that the hook 16 has engaged the hooking portion 21 and that ID verification has been accomplished to automatically lock the hook 16. However, in addition to the two conditions described above, the hook 16 may be locked when a further switch is manually operated. The further switch is arranged in, for example, the lock unit 23.

The unlock switch 47 may be arranged on the electronic key 80. In this case, when the unlock switch of the electronic key 80 is operated, the electronic key 80 transmits a wireless unlock signal to the vehicle 1. In the vehicle 1, the ECU 24 of the locking device 20 recognizes operation of the unlock switch through communication with the verification ECU 71 and the charge ECU 75.

In the embodiment described above, in a state in which the locking device 20 is coupled to the inlet 31, the bolt holes 29*c* and 29*d* of the two fastening plates 29 are aligned with the two bolt holes 35*c* and 35*d* of the base 32. However, as long as the bolt hole of either one of the two fastening plates 29 is aligned with a bolt hole of the base 32, a bolt may be inserted into the aligned bolt holes to fasten the locking device 20 to the inlet 31 and the vehicle 1.

In the embodiment described above, the recesses 28*a* and 28*b*, which accommodate the heads of the bolts 36*a* and 36*b*, are formed in the housing 20*a* of the locking device 20. Instead, the recesses 28*a* and 28*b* may be arranged in the base 32 of the inlet 31. In this case, the depths of the recesses are set so that the heads of the bolts 36*a* and 36*b* do not project out of the upper surface of the base 32 when the bolts 36*a* and 36*b* are in a fastened state. The housing 20*a* also hides the bolts 36*a* and 36*b* in this structure and thus obtains the same advantages as the embodiment described above.

In the embodiment described above, the bolt holes 29*c* and 29*d* of the fastening plates 29 are respectively in communication with the bolt holes 35*c* and 35*d* of the base 32 when the locking device 20 is coupled to the plug port 33. However, the bolt holes 29*c* and 29*d* of the fastening plates 29 do not have to be in communication with the bolt holes 35*c* and 35*d* of the base 32. In this case, the bolts 36*c* and 36*d* extend through the bolt holes 29*c* and 29*d* and the outer side of the base 32 to be fastened to the vehicle 1.

In the embodiment described above, the inner dimensions of the frame 26 in the housing 20*a* of the locking device 20 are smaller than the outer dimensions of the power feeding plug 10. However, the inner dimensions of the frame 26 in the housing 20*a* may be greater than the outer dimensions of the power feeding plug 10. In this case, the engagement of the lock bar 43, the hook 16, and the hooking portion 21 also fixes the locking device 20 to the inlet 31. This prevents removal of the locking device 20.

In the embodiment described above, the sloped surface 16*b* of the hook 16 may be changed to a level surface. In this case, for example, it is preferable that a structure that restricts movement of the lock bar 43 relative to the locked hook 16 be newly added. For example, the lock bar 43 and the hook 16 may be formed from a material that increases the frictional force of the lock bar 43 and the hook 16. Alternatively, a projection that contacts the lock bar 43 may be formed on the hook 16. As another option, the hook 16 may include a through hole or recess that receives the lock bar 43.

In the embodiment described above, the powered device is a hybrid vehicle 1 but may be an electric vehicle. Further, the powered device is not limited to the vehicle 1 as long as power can be fed by the power feeding plug 10.

The heads of the bolts 36*c* and 36*d* may be insert-molded with the fastening plates 29. In this case, in a state in which the shafts of the bolts 36*c* and 36*d* are inserted into the bolt holes 29*c*, 35*c*, 29*d*, and 35*d*, nuts are fastened to the shafts from the inner side of the vehicle 1 to fasten the locking device 20 to the vehicle 1 through the inlet 31. By insert-molding the heads of the bolts 36*c* and 36*d* in the fastening plates 29, the heads are not exposed to the exterior. Thus, the heads cannot be rotated from outside the vehicle 1, and unauthorized removal of the locking device 20 is prevented.

The present examples and embodiments are to be considered as illustrative and not restrictive, and the invention is not to be limited to the details given herein, but may be modified within the scope and equivalence of the appended claims.

The invention claimed is:

1. A locking device that locks a movable hook of a power feeding plug, which is engaged to an inlet of a powered device, to restrict removal of the power feeding plug from the inlet, the locking device comprising:
   a housing coupled to the inlet, wherein the housing covers a peripheral portion of the inlet, and the housing includes a hook port that receives the movable hook when the power feeding plug is inserted into the inlet and a hooking portion at the hook port and fixed with respect to the housing that the movable hook engages; and
   a movable member arranged in the housing, wherein the movable member moves between a lock position, in which the movable member blocks and locks the movable hook that is hooked to the hooking portion at the hook port to prevent disengagement of the hook with the hooking portion, and an unlock position, in which the movable member permits the movable hook to move relative to the hooking portion allowing disengagement of the hook with the hooking portion and permitting the removal of the power feeding plug from the inlet.

2. The locking device according to claim 1, wherein
the inlet includes a plurality of bolt holes and one or more bolts inserted into one or more of the bolt holes to fasten the inlet to the powered device; and
the housing, which is coupled to the inlet, covers and hides a head of the one or more bolts.

3. The locking device according to claim 2, wherein
the housing includes at least one housing bolt hole aligned with at least one of the inlet bolt holes that is free from the one or more bolts, and
the bolts are of a first type, and the inlet further includes at least one bolt of a second type inserted from the at least one housing bolt hole into the at least one inlet bolt hole to fasten the housing and the inlet to the powered device.

4. The locking device according to claim 1, wherein
the inlet includes a plurality of bolt holes,
the housing includes at least one housing bolt hole aligned with at least one of the inlet bolt holes, and
the inlet includes at least one bolt inserted from the at least one housing bolt hole into the at least one inlet bolt hole to fasten the housing and the inlet to the powered device.

5. The locking device according to claim 1, wherein the housing includes a frame that receives the plug port of the inlet, and the frame has an inner dimension that is smaller than an outer dimension of the power feeding plug to prevent the power feeding plug from entering the frame.

6. A locking device for use with an inlet including a plug port, which receives a power feeding plug, and a base, which includes a bolt hole, wherein the locking device locks a hook of the power feeding plug in a state in which the hook is engaged with an outer surface of the plug port to restrict removal of the power feeding plug from the inlet, the locking device comprising:
a housing including a frame, which receives the plug port, and a hook port, which receives the hook;
a movable member that moves between a lock position, in which the movable member is arranged inside the hook port, and an unlock position, in which the movable member is arranged outside the hook port, wherein the movable member, when located at the lock position, locks the hook in a state in which the hook is engaged with the outer surface of the plug port; and
a controller that moves the movable member to the lock position when the plug port receives the power feeding plug;
wherein the housing is fastened to the base to hide a fastening bolt, which is inserted into the bolt hole; and
when the plug port receives the power feeding plug and the movable member is located at the lock position, the movable member contacts the hook port and the hook, which is engaged with the outer surface of the plug port, to restrict removal of the housing from the base.

7. The locking device according to claim 6, wherein when the power feeding plug is connected to the plug port and the movable member is located at the lock position, the movable member is arranged between the housing and the hook to restrict removal of the housing from the base.

8. The locking device according to claim 6, wherein when the power feeding plug is disconnected from the plug port, the movable member is separated from both the hook port and the hook to permit removal of the housing from the base.

9. A power supplying system comprising:
a power feeding plug including a hook;
an inlet including a plug port, which receives the power feeding plug, and a base, which includes a bolt hole;
a locking device fastened to the base of the inlet, wherein the locking device locks the hook of the power feeding plug in a state in which the hook is engaged with an outer surface of the plug port to restrict removal of the power feeding plug from the inlet, and wherein the locking device includes:
a housing including a frame, which receives the plug port, and a hook port, which receives the hook, wherein the frame has an inner dimension that is smaller than an outer dimension of the power feeding plug;
a movable member that moves between a lock position, in which the movable member is arranged inside the hook port, and an unlock position, in which the movable member is arranged outside the hook port, wherein the movable member, when located at the lock position, locks the hook in a state in which the hook is engaged with the outer surface of the plug port; and
a controller that moves the movable member to the lock position when the plug port receives the power feeding plug;
wherein the housing is fastened to the base to hide a fastening bolt, which is inserted into the bolt hole; and
when the plug port receives the power feeding plug and the movable member is located at the lock position, the movable member contacts the hook port and the hook, which is engaged with the outer surface of the plug port, to restrict removal of the housing from the base.

10. The power feeding system according to claim 9, wherein
the hook includes a sloped surface that contacts the movable member, and
when the plug port receives the power feeding plug and the movable member is located at the lock position, the movable member is arranged between the housing and the sloped surface of the hook to restrict removal of the housing from the base.

* * * * *